US009811978B2

(12) United States Patent
Ginsberg

(10) Patent No.: US 9,811,978 B2
(45) Date of Patent: Nov. 7, 2017

(54) INDEXING METHODS AND APPARATUS WITH COMPETITIVE PERFORMANCE PARAMETERS

(71) Applicant: CFPH, LLC, New York, NY (US)

(72) Inventor: Philip M Ginsberg, Newport Coast, CA (US)

(73) Assignee: CFPH, LLC, New York, NY (US)

( * ) Notice: Subject to any disclaimer, the term of this patent is extended or adjusted under 35 U.S.C. 154(b) by 346 days.

(21) Appl. No.: 13/886,585

(22) Filed: May 3, 2013

(65) Prior Publication Data

US 2013/0296009 A1 Nov. 7, 2013

Related U.S. Application Data

(60) Provisional application No. 61/642,812, filed on May 4, 2012.

(51) Int. Cl.

| | |
|---|---|
| ***G06F 17/00*** | (2006.01) |
| ***G07F 17/32*** | (2006.01) |
| *A63F 9/24* | (2006.01) |
| *A63F 11/00* | (2006.01) |

(52) U.S. Cl.

CPC ...... *G07F 17/3293* (2013.01); *G07F 17/3237* (2013.01); *G07F 17/3239* (2013.01); *G07F 17/3276* (2013.01); *A63F 2009/2435* (2013.01); *A63F 2011/0072* (2013.01)

(58) Field of Classification Search

CPC ............ G07F 17/3237; G07F 17/3276; G07F 17/3293; G07F 17/3239; A63F 2300/554; A63F 2300/558; G06F 17/3053; H04L 67/22; H04N 21/44008

USPC ............................................. 463/23, 40–42

See application file for complete search history.

(56) References Cited

U.S. PATENT DOCUMENTS

2004/0097287 A1* 5/2004 Postrel ............................ 463/41
2005/0192097 A1* 9/2005 Farnham et al. ............... 463/42
2006/0177109 A1* 8/2006 Storch ....................... A63F 1/00 382/118
2007/0149290 A1* 6/2007 Nickell et al. .................. 463/42
2007/0191101 A1* 8/2007 Coliz et al. ..................... 463/42
2007/0265718 A1* 11/2007 Graepel et al. ................ 700/91

* cited by examiner

*Primary Examiner* — Justin Myhr
(74) *Attorney, Agent, or Firm* — Mark Miller

(57) ABSTRACT

Some embodiments may include a poker indexing service. For example, a multi dimensional vector of player performance and/or other data may be determined based on gaming related activity that is input or otherwise captured. Such a vector may be used in various forms to generate a metric or to facilitate wagering and/or other gaming activity. Other methods and apparatus are described.

10 Claims, 3 Drawing Sheets

INDEXING METHODS AND APPARATUS WITH COMPETITIVE PERFORMANCE PARAMETERS

FIELD

Some embodiments may relate to poker, card games, wagering activity, sports, competitive events, and so on.

BACKGROUND

Poker may involve a plurality of players competing against one another in a hand, at a table, in a tournament, in a virtual environment, in person, and so on.

SUMMARY

The following should be understood to be embodiments, not claims.

DETAILED DESCRIPTION

I. Example Embodiments

Some embodiments a plurality of players may play in a variety of poker games in any number of venues. Various attributes of their play may be determined and used to create an index for each player. Such an index may be used to measure various aspects of player performance, track player progress, match players, form wagers with some aspect of the index as a basis for the wagers, determine cheating players, and so on. It should be recognized that while various non-limiting examples are given in terms of poker, that any card game, competitive event, luck based events, or other actions may be used in various embodiments in addition to or as an alternative to poker.

Figure 1:
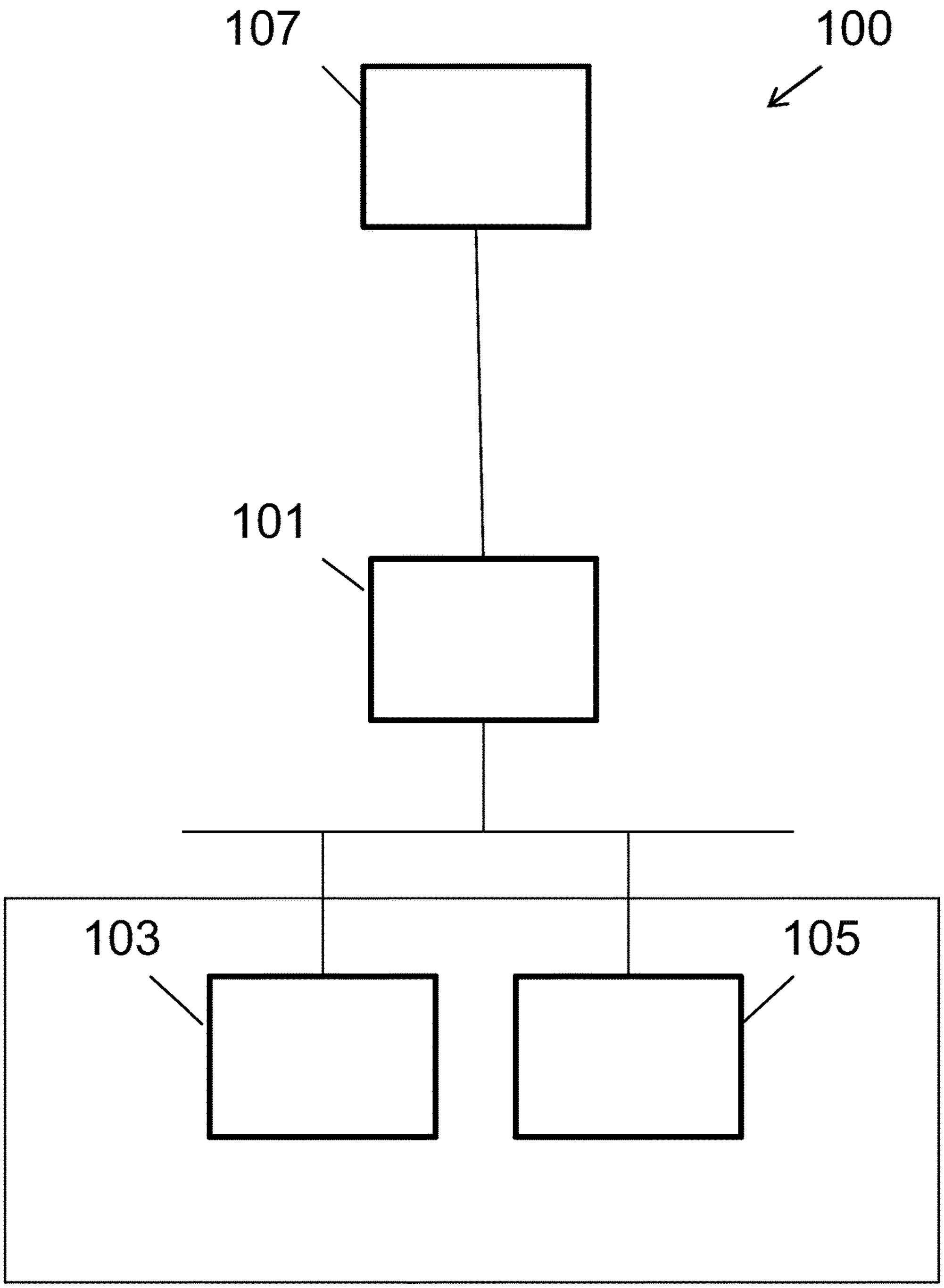
FIG. 1 shows an apparatus that may facilitate indexing in some embodiments.

FIG. 1 illustrates an example of a system 100 that may be used in some embodiments. System 100 may function to facilitate indexing and/or other functionality described herein. System 100 may include a server 101, a capturing device 103, an input device 105, a remote facility 107, and/or any desired devices in any combination. Such devices may communicate over a communication network such as the Internet, a LAN, and so on. It should be recognized that this example system is given as a non-limiting example only and that other embodiments may be arranged and/or configured in any manner using any elements (e.g., a distributed manner, Software as a Service arrangement, with fewer, more and/or different components, and so on).

System 100 may include a server 101 (e.g., a tracking or indexing device). Server 100 may include any one or more computing devices such as servers, blades, cloud computing services, personal computers, mobile devices, and so on. Such a system may communicate with one or more other devices such as through a communication network to facilitate indexing and/or other functionality described herein. For example, server 101 may receive input from other components that identify player and/or performance of players. Server 101 may process such information to form a vector, index, and/or other metric. Server 101 may transmit information about such processed information (e.g., to players, to gaming providers, to data sources, and so on). Server 101 may use or otherwise facilitate the use of such processed information for matching players, rating players, allowing selection of players, wagering, and so on.

System 100 may include a capturing device 103. For example, such a device may include a video camera, a data feed processor, a video analysis device, a kiosk or other input device, a computing device that can accept and/or process input, any device that may be used to facilitate the inputting of player and/or performance information. As one example, a video camera may capture player facial information to identify a player. The video information may be processed to identify a player based on stored facial information. The video camera may capture play of that player. The play of the player may be processed to determine actions related to play (e.g., wins, losses, etc.) by that player and may be stored or processed. In some embodiments, a capturing device may include a device that allows for passive capturing of player and/or performance information without a specific input form the player or other person (e.g., by recording images and processing those images). It should be recognized that any device(s) may be used to capture activity and player information as desired in various embodiments. Input captured by such a device may be stored and/or processed to help facilitate indexing services. For example, input may be transmitted to server 101.

System 100 may include an input device 105. For example, such a device may include a keyboard, a button, a kiosk, a user interface, any device that may be used to allow input to be entered regarding player and/or performance information. As one example, a keyboard may be used by a dealer at a table and/or attendant watching play to enter information identifying play by players (e.g., a dealer may enter wins and/or losses into the keyboard at a poker table). As another example, a device, such as a video poker device or other kiosk through which play of poker may be facilitated may be considered an input device. For example, a player may make the input at such a device herself by inputting actions to be taken in a game. Input entered into an input device may be stored and/or processed to help facilitate indexing services. For example, input may be transmitted to server 101.

Input device 105 and/or capturing device 103 may be located in a gaming venue such as a casino as illustrated in FIG. 1. Such devices may be located in different venues. Such devices may include any number of such devices operating together or separately to facilitate indexing functionality.

System 100 may include a remote facility 107 and/or interface with any number of remote facilities. For example, such a remote facility may include an internet wagering site, a casino, any venue at which gaming may take place, and data source for player and/or performance data, and so on. One example of such a remote facility may include an internet poker site at which players may play poker games. Such a site may record player and/or performance information and store or process such information for activity through the site. Another example may include a casino. Such a casino may capture player or performance information for activity at the casino and may store or process such information. For example, raw camera data, analyzed camera data that identifies specific actions, and so on may be transmitted to server 101 from a casino. Activity at a remote facility may be e stored and/or processed to help facilitate indexing services. For example, information about such activity may be transmitted to server 101.

Server 101 may process information about player and/or performance information received from any source(s). Such information may then be transmitted or used to facilitate wagering or other activities through the server 101 or another device or venue (e.g., to form a tournament, transmitted to a gaming service, shared with remote facilities, sold as data, displayed to players, transmitted to player devices, and so on).

Figure 2:
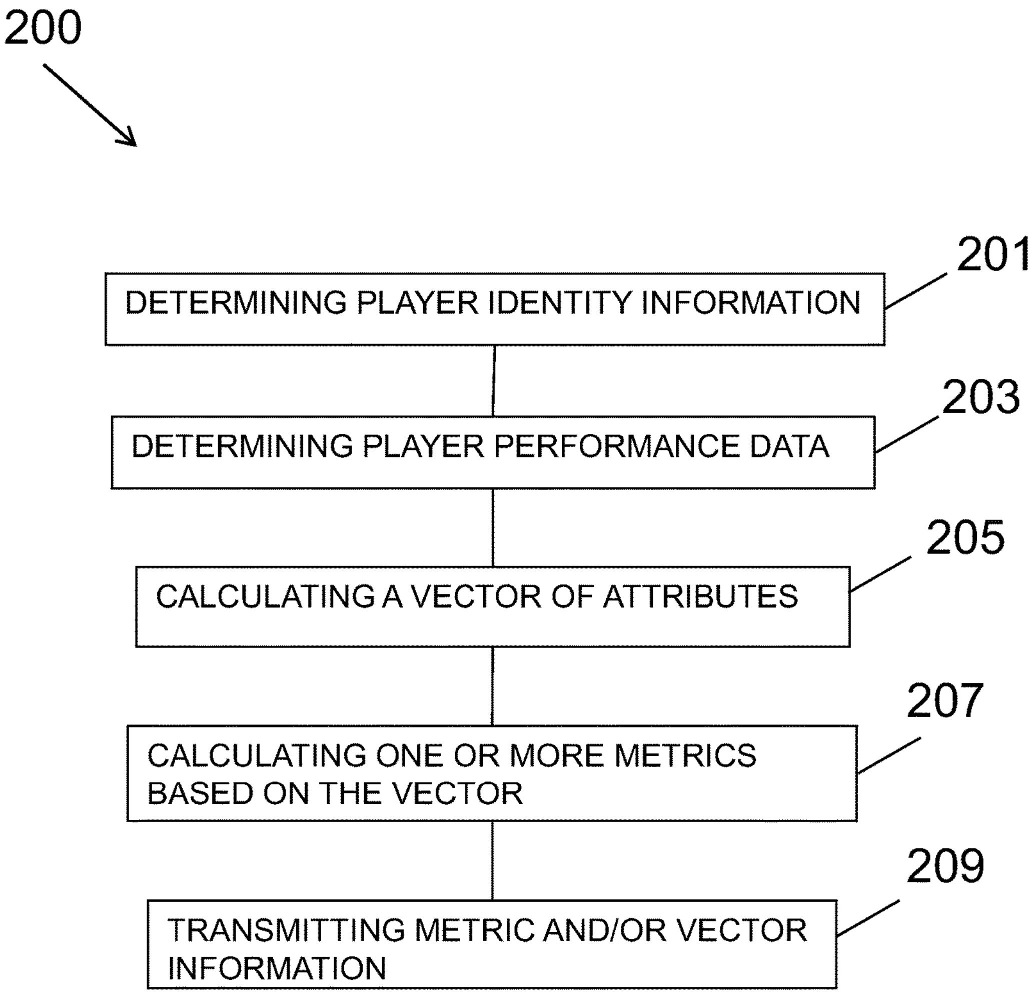
FIG. 2 shows an example method that may be performed in some embodiments.

FIG. 2 illustrates an example process 200 that may be used in some embodiments. Process 200 may, for example, be performed by system 100. Process 200 may be performed by server 101. Process 200 may be performed by any device and/or entity in any arrangement and/or combination as desired. Process 200 is given as a non-limiting example and other embodiments may include other arrangements, action, and so on in any order and number as desired. Process 200 may be used to facilitate indexing related to player performance.

As indicated at block 201, some embodiments may include determining player identity information for one or more players. For example, some embodiments may include initializing and/or populating a database with player information (e.g., in response to a registration process of a player, in response to receipt of player data, etc.). For example, players may sign up to use an indexing service and/or play a poker game (e.g., through a website, through a kiosk, at a registration table, etc.). A poker website, tournament entry agent or device, and/or other input mechanism may capture such information. Such information may be stored (e.g., in a database). Identity information may include names, aliases, personal information, demographic information, biometric information, any information that may be used to track, monitor, identify, audit, recognize, and so on a player. Such determining information may include storing any identifying characteristics, such as facial info for us in capturing and tracking users later, names, fingerprints, passwords, aliases, identity of a mobile device that can be used to track a player's movements, rewards, credit, or other card that may be swiped by a player and used to track a player location, and so on. Such stored information may be used to identify a player at a later time (e.g., based on a user signing into a system, in response to a user swiping a player card in a device or at a table, in response to a player being recognized by a facial recognition system, in response to a determination that a player's mobile device is located in a particular gaming location, and so on). Such determining of information may be done as a one off for each player as a player signing up for a gaming or indexing service or event. Such determining information may be done in bulk, such as such as a capture of data from a remote facility signing up to use a indexing service and transferring their bulk database of player data into the indexing service.

As indicated at block 203, some embodiments may include determining player performance data for at least some of the one or more players based on past and/or current performance. For example, various attributes regarding play of one or more players (e.g., a single player, all players that are being tracked, some players that have been identified) may be received (e.g., from a data capture device, from a remote facility, from an input device). Such information may include data identifying past performance (e.g., data from prior time periods such as before a player joined an indexing service), such data may include data identifying concurrent performance (e.g., an ongoing and/or recently finished game). Such information, for example, may include information related to events in a game, events surrounding a game, attributes of a player and/or game, circumstances that may relate to game play and/or outcomes of a game, and so on. Such information may be received by a server from a variety of sources and processed to determine which player the information is associated with. For example, a server may receive a player alias and/or any other desired identifying information together with performance data so that the server may properly associate the data with the player. Such information may be stored and/or processed as desired. This information may be used to build an index, metric, vector, and/or other assessment of one or more players that may change over time as more and more information about the player is received and/or the player continues to play games. Such information may be stored in a history of play by the player.

Some non-limiting examples of performance information that may be collected may include: time per game, number of folds, number of hands played to a flop, number of hands played to a turn, number of hands played to a river, number of hands placed to completion, number of wins, number of losses, number of wins by raising of other players out of a game, number of wins when betting all in, number of all in bets, number of losses when betting all in, number of raises, number of calls, number of raises on a flop, number of raises on a turn, number of raises on a river, average amount of a raise, average amount of a raise in certain game states, highest raise, lowest raise, speed of decision making, times of day of games, wins by time of day, amount of money won, amount of money lost, volatility in total wins-losses, success at receiving a straight when hoping to receive a straight, success at receiving a flush when hoping to receive a flush, average hold cards dealt to player, actions taken in games, bets made in games, results in games, states of games, number of players at a table, and so on.

Some non-limiting examples of information that may be collected about a player may include: performance data, wins, losses, tells, vocalizations, times of day, ethnicity of players, gender of players, religion, days, holidays, number of players at a table, live vs virtual, color of hair, clothing style, glasses or no glasses, hat or no hat, facial hair, hair style, chip handling, volume level, amount of words spoken, facial expressions, and so on.

Separately itemized pieces of information should not be understood to mean that two things are mutually exclusive. For example, wins may be part of performance information in some embodiments but may not necessarily be so. An inclusion in performance of other information is non limiting. For example, in some embodiments time of day may be considered performance data and in other embodiments it may not be.

As indicated at block 205, some embodiments may include calculating a vector of attributes for one or more players based on received data about each respective player. In some embodiments, each or one or more dimension of such a vector may include a quantifiable piece of data that identifies some measurable performance of the player in that dimension. For example, one dimension may measure total monetary winnings, one dimension may measure total hands won. In some embodiments each or one or more dimensions may include a numerical value. In some embodiments, each or one or more dimensions may include non-numerical data. For example, a dimension may include personality descriptors, demographic descriptors, and so on. For example, a race, gender, clothing, and so on descriptor dimension may be part of a vector together with a hands won dimension and/or any number of or types of other dimensions. Each vector dimension may be updated as a player plays more and/or more information about a player is received.

Some non-limiting examples of possible vector dimensions may include: A) size of game played, B) median or average and range of quality or rankings of other players in the game, C) number of hands played, D)—number and size of raises made, E)—all in bets made, F)—personal attributes observed or recorded, e.g., comments made, sunglasses worn, chip handling, food or drink consumption, clothing worn, age, gender, backgrounds and info from Google, Facebook, Tweets, etc., G)—number of hands folded, H)—quality of cards received, I)—time line of chip accumulation, J)—Other player or game attributes among others. Some further examples of vector dimensions may include dimensions that measure and/or in some way use information such as performance or other non-performance information that may be collected to calculate. Some still further examples of possible vector dimensions may include number of hands played per tournament, number of hands played per win of a table, number of hands played in the last time period, number of hand splayed total, average win per hand, average win per table, average win per tournament, highest win per X, lowest win per Y, highest loss, best times of day, best days of week, expected wins for play on a day of the week and/or time of the day, number of tournaments won, number of tournaments lost, clothing style, facial expressions, tells, chip handling, drinks consumed, average drinks consumed, time to make decisions, time to make winning decisions, drinks consumed for wins, drinks consumed for losses, average raise, average winning raise, number of winning bluffs, number of bluffs, and so on. It should be recognized that any desired vector dimension may be calculated. It should be recognized that vector dimensions may be contingent on a variety of information in any combination (e.g., average wins against women).

One non-limiting example of updating and/or calculating a vector may include: a player having a $10000 total dollars won dimensions, 100 total hands played dimension, and a luck dimension that indicates a 0.4 luck rating. The player may win a hand and earn $100. In response, a total dollars dimension may be increased to $10100, and a total hands won dimension may be increased to 101. In some embodiments, if the win did not include an element of luck accounted for by the luck dimension (e.g., the player was expected to win the hand based on the state of the game), the luck dimension may be unaffected. If the win did include an element of luck accounted for by the luck dimension (e.g., the player drew a straight), then the luck dimension may be increased by some amount to account for the win. Some embodiments may include adjusting a description of a dimension as well. For example, a gender dimension may be changed in response to a determination of a gender change of the player, a clothing descriptor may be augmented in response to clothing worn by a player, and so on. It should be recognized that such an example is non-limiting and that one of ordinary skill in the art would understand how to apply such dimension adjusting to various other desired dimensions based on these examples.

It should be recognized that examples of vector dimensions are given as non-limiting examples only. It should also be recognized that although example dimensions have been given as stand alone, that vector dimensions may be interrelated in any manner desired. For example, any number of contingent dimensions may exist (e.g., wins when playing in games with more than X dollars, luck when playing against men, all in bets won when playing after 4 pm, and so on). It should be recognized that such combinations are non limiting and that any dimension may be related to any other dimension or other information in any manner and in any combination in any manner.

As indicated at block 207, some embodiments may include calculating one or more metrics from one or more dimensions of one or more of the vectors. One or more algorithms may be used to convert such vectors to a metric. Such a metric may be referred to as an index. A metric may include a numerical or other quantifiable measure. For example, a weight may be given to each numerical dimension of a vector. Each weight may be multiplied by each dimension value and the results may be summed to come to a total value. In some embodiments, a plurality of dimensions may be combined in any manner (e.g., divided, summed, subtracted, multiplied, other mathematical or other operator applied, individually or in combination as desired).

For example, in some embodiments, a number of games won dimension may be divided by a number of games played dimension and added to a 0.1 weight multiplied by an amount of money won dimension to create a metric. In some embodiments, a descriptor dimension such as clothing or gender may be used to form such a metric. For example, woman in a gender dimension may increase or decrease a metric by a desired amount. It should be recognized that such an example is non-limiting and that one of ordinary skill in the art would understand how to apply such metric determination based on these examples.

Such a metric may be referred to as an index metric or an index or an index value. Such an index metric may be used to compare one player's ability to another player's ability.

Some embodiments may include determining a descriptor for a metric. For example, cluster analysis may be performed based on a determined numerical metric to determine a description. Players in a higher cluster may be assigned a designation to indicate their higher performance (e.g. A level or top tier players). Lower clusters may be assigned lower rankings (e.g., B level or second tier players, and so on).

Vector and/or metric information may be updated as more performance data is received. In some embodiments, newer performance data may be weighed more than older performance data in calculating a vector dimension and/or metric. For example, in some embodiments, a vector and/or metric may only include a last year's worth of performance and other data may be removed. In some embodiments, a last six months of data may be given more weight than a prior six months of data.

In some embodiments, an index metric and/or some other metric may correspond to a number that may be multiplied by an amount of money (e.g., a total amount of money at a table, an amount of money a player brings to the table). A result of such an operation may result in an expected value of the money the player will leave the table with. Such a metric may be determined based on historical data of games played, a vector, other players at the table, and so on.

As indicated at block 209, some embodiments may include transmitting metric and/or vector information for one or more players. Such information may be transmitted to remote device (e.g., player device so players can see their ranking, gaming devices to be used to match players or track players, other destination as desired).

It should be recognized that FIG. 2 is given as a non-limiting example only. Other embodiments may include differently ordered actions, similar actions, different actions, fewer actions, more actions, no actions, and so on as desired.

Matching Examples

Some embodiments may utilize vector and/or metric information to match or otherwise allow players to match with other players for a game.

For example, in some embodiments, players in a poker website may be matched with players that are in a similar and/or same cluster, have a similar or same dimensions of a vector, have similar or same metrics, and so on. For example, a poker website tournament may be run with only A ranked players, only B ranked players, and so on. Players for a game may be limited to metric scored in a middle 20 percent of scores, players in a game may not have more than a 10% difference from one another, and so on. It should be recognized that individual and/or tournament play at a poker website may be configured in any manner to add players and/or prevent players from joining based on such index related information.

As another example, some embodiments may include a gaming provider such as a mobile gaming provider, a tournament operator, a casino, and so on. Such a gaming provider may similarly use such information to match or allow players to be matched for a game and/or tournament as desired.

Some embodiments may include forming specific grouping of players based on such index related information. For example, to maintain interest in a game or tournament, specific table attributes may be desirable and players may be chosen for a table to provide those attributes. One example may include forming tables so that certain dimensions of a vector when summed across people at a table reach a desired threshold value (e.g., some desired percentage of all in games for the players at the table, some desired percentage of men and women, some desired percentage of lucky players, and so on). Some embodiments may include selecting players to create a more exciting table in a variety of ways. For example players that have a chatty dimension with a high value may be matched together to create a talkative table, players that have a high luck value may be matched together to create a lucky table, players that have a high bluff dimension may be matched together to create a bluffers table, players that have a number of all ins per game may be matched together to form a high risk table, players that have a high number of hands played to a certain point may be matched together to create a highly active table, and so on as desired. It should be recognized that such examples uses of various dimensions are given as non limiting examples only and that any desired dimension, combination of dimensions, metrics, and so on may be used to form a table as desired.

Some embodiments may include a player or bet wanted system. For example, one player may request to be matched with another player or players that have some desired characteristic. For example, a player may desire to play against women who have won some amount of money total and who have a high talkative dimension. That player may enter that information into an interface and in response to receiving that information, a system may match that player with players that match the identified criteria. For example, a table may be formed and advertised to players with matching criteria to encourage those players to join the table.

Data Use Examples

Some embodiments may include compiling various data collected into information desired by one or more entities. For example, some embodiments may include determining a number of people in various demographic groups playing poker, how one demographic group performs against another, a success rate of one or more players in a given situation, and so on. Such information may be shared with spectators, one or more players, a player about whom the information pertains, advertisers, producers of an event, and so on.

Some embodiments may include calculating metrics with certain information controlled or stabilized. For example, some embodiments may include determining a player's win percentage against Asian players. In such an example, history data for a player may be searched for games that involve Asian players and a win percentage may be calculated from that historically recorded data. As another example, some embodiments may include a player's index metric in games played after 4 pm. In such an example, a history may be searched for just games played after 4 pm (e.g., between 4 pm and midnight or some other end of day time) and an index metric (e.g., as described above with respect to determining an index from a vector) may be determined for that subset of historic data. As yet another example, some embodiments may include a player's bluff success against women. In such an example, a history data may be processed to find games in which the player bluffed against a woman opponent and metric that indicates a rate of success in those situations may be calculated from that data (e.g., a percentage of won games in that set of found games). As still another example, some embodiments may include an amount of money won by a player when the player wears certain clothing. In such an example, a set of game history may be referenced to determine games in which such clothing was worn and a sum of money won from those games may be calculated. As still a further example, some embodiments may include determining an index metric or other metric from a vector with one or more dimensions eliminated or held constant or only some subset of data used (e.g., index metric for all players from 4 to 6 pm on weekdays, metric for online poker play only, metric for high stakes tables only, metric for play against women only, index metric without any weight given to one or more dimensions), and so on. It should be recognized that any combination of dimensions may be controlled or combined to provide various information, any desired subset of data may be used, a metric may be calculated and so on as desired.

Some embodiments may in receiving a request for information (e.g., through a user interface of an indexing service and/or gaming service), calculating that information in response based on received and/or recorded data, and providing the requested information to the requestor (e.g., presenting it in a user interface). Some embodiments may include selling such data to requesting parties. For example, a poker site may purchase vector or other information from an index service. Such data may be provided to a requestor in response to receiving a payment from the requestor of some fee for the data.

Some embodiments may include a self assessment mechanism (e.g., a user interface through which a player may enter a self assessed mechanism or self assessed rating such as A ranked player). For example, a player may enter a guess about their metric or ranking into a user interface. A player may then be able to compare their actual play to their assessed play so that they can better gauge their own ability. In some embodiments that may use data to match players together or allow players to join games, a self assessment may be used for matching a player before a player has performance data or sufficient data to form an accurate metric (e.g., a self assessment may be used instead of an index metric for some period of time or until some number of games have been played). In some embodiments, a player may be able to reassess over time, an assessment may be changed in response to actual play, and/or other changes to an assessment may be made or allowed.

Some embodiments may include monitoring performance data about a player and comparing it to self assessments of that player. This may allow a system to prevent a player from gaming a system by entering into low skill tables when the player is in fact a high skill player. For example, if a player performance data exceeds some threshold comparison to their assessment, the player may be treated as the performance data indicates rather than the assessment (e.g., prevented from entering games reserved for different rankings of players).

In some embodiments, such monitoring data and comparing to self assessments may help a player gauge their improvement or failure at game play. For example, a system may suggest change to play along vector dimension to get a higher ranking (e.g., may indicate through a user interface that bluffing more may improve a ranking). As another example, a changing performance over time may corresponding to an increase in a metric and the player may be told that continuing such change in play style (e.g., going all in more) has bettered their play. A player may be told how their metric could improve by adjusting one or more dimensions when compared to better ranked players as a suggestion for improvement.

Some embodiments may include using the available or tracked data to determine activity and/or characteristics of the activity at a particular time. For example, the tracked information may be used to determine where players are playing. Such information may be shared or presented to potential players to attract players to a location and/or attracted viewers to the location. For example, a determination of that a set of high stakes players are currently playing in a particular casino may be made, a determination that a set of high ranked players play at a particular poker site regularly at a certain time may be made, and so on. Such data may be shared with advertisers, casinos, producers of tournaments, and so on.

Some embodiments may include tracking specific hands. For example, a specific high luck hands or a number of high luck hands may be determined. Such high luck hands may be more exciting to watch, so tracking such hands may be useful to indicate to potential viewers where a highly exciting level of activity is taking place and/or to determine which hands to report on or display to viewers or which table to show to viewers. For example, a producer of a show that displays hands in a tournament may be presented with information about how lucky various tables in the tournament are currently or have been during play in the tournament. Such producer may use or a computer may automatically using such information determine which tables or hands to broadcast from the tournament that may be most exciting for viewers to watch.

History and Luck Examples

Some embodiments may include recording and/or tracking player history and/or historic performance data. For example, a history of games and/or tournaments a player has played in may be maintained (e.g., actions taken by the player, results of the actions taken by the player, wins, losses, states of games, bluffs, luck, personal characteristics, and so on). Such information making up a history may include actions taken, results of actions, money won, money lost, video recordings, descriptions of games, audio recordings, information that may be used to create a recreation of a game, computer graphics recreations of a game, and so on. In some embodiments, such a history may include a general history of all games (e.g., all games captured for all players, all games captured for players of a particular rank, and so on). In some embodiments such a history may include a history of specific games that may have some characteristics (e.g., well played, highly lucky, high stakes, games played in tournaments, games with a minimum stake, won games, lost games, games with an minimum amount of money at risk, etc.)

In some embodiments a history may be used to determine a lucky and/or unlucky streak and/or rating for a player. For example, a player and/or producer, and/or gaming operator may determine when they were lucky, if they are on a lucky streak, if they are on an unlucky streak, if luck corresponded to some other events in their lives, and so on. A system may determine such information and present it to a player. Such information may be shared with other players and/or viewers of play.

Luck may be determined in any number of ways. One example calculation of luck may include determining a quality of cards dealt to a player in a poker game. For example, low ranked cards may be considered unlucky. High ranked cards may be considered lucky. A measure of luck may increase as a player receives more high ranked cards and decrease as a player receives more low ranked cards. Another example calculation of luck may include determining game outcomes that have a lower probability. For example, if a player accomplishes a straight by drawing two cards in the straight on a turn and river, such a result may add greatly to a luck value. A result that is unlikely to happen based on some state of a game (e.g., before cads are dealt, hole cards are dealt, flop is dealt) but does happen and is positive for the player (e.g., draw straight, draw flush, royal flush, etc.) may result in an increase in a luck rating. A negative result that is unlikely to happen but does happen may count as a decrease in luck. A lack of a positive result happening may decrease a luck value. A lack of a negative result happening may increase a luck value. It should be recognized that any combination of positive, negative, likelihood, happening, and so on may be used to generate a measure of luck as desired. Similar to any other vector dimension or metric, a luck metric may degrade over time at a same or different rate than other measures (e.g., luck may be day long, week long, ear long, etc.).

Wagering Examples

Some embodiments may include using an index, vector, and/or ranking as a basis for a wager. For example a person may wager on whether a player will reach a ranking (e.g. by a certain date). A server may receive such a wager from a player through a user interface. A wager outcome may be determined and the person may be paid in response to such a determination based on actions by the player (e.g. obtain or not obtain the rank, obtain or not obtain the dimension level of the vector such as amount of hands won). Odds and/or payouts for such a wager may be set by a bookmaker. For example a server may determine expected chances of a player obtaining a metric based on the player's historic performance. Based on those chances, the system may provide odds and/or payout levels for a wager.

In some embodiments, a ranking, vector, and/or metric may be used to form a handicap of one or more players against one or more other players. For example, players at a table may be compared to one another and given some handicap for play at the table. For example, a handicap may identify how long each player is expected to survive at a table, what place the players are expected to achieve at the table, how much money the players are expected to win at a table, how much money a player is allowed to start with at a table, and so on. In some embodiments, for example, a metric may inversely affect an amount of money that each player may enter the table with. For example, higher rated players may enter with less money thereby creating an expectation level of play at the table that is equalized. An online poker site may populate a player's table account with up to some maximum amount of money based on such a handicapping system. As another example, some embodiments may give a player a win at a table if the player finishes in a position that is not first based on a handicap. For example, if a lowest ranked player finishes second at a table, the player may be considered to have won against the higher ranked players. It should be recognized that various forms of handicapping and/or equalizing may be used based on a matric, vector, ranking and so on.

Sponsored Contests Examples

Some embodiments may include determining awards or winners based in some manner on rankings, vectors, index metrics, a particular one or more dimensions, a change to one such elements, and so on.

For example, an award may be given to a "rookie of the year" being someone that has a ranking in a "rookie" or "C" or other metric range and shows some improvement or performance during a period of time (e.g., a year). A most improved player for a year or over the course of some time or event may be given some award or recognition. For example, in response to determining that on online poker player in a rookie category has won a most number of hands in a year, that player may be awarded by increasing a value of his or her monetary account.

As another example, an award may be given to a most successful bluffer of a season. A determination may be made that a player has successfully bluffed more than any other player (e.g., all players, players in a ranking range, players with particular vector attributes, and so on). In response, the player may be awarded and/or recognized.

It should be recognized that a determination regarding a change or value of a index, change in an index, one or more dimensions of a vector, change in one or more dimensions of a vector, and so on over a time period and/or event may be used in determining a winner of some award or recognition.

The following sections provide a guide to interpreting the present application.

II. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine. The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

III. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VII. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VIII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of or the phrase" steps of in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

IX. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

X. Incorporation By Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

XI. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XII. Cards

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards. Other types of playing cards are described herein, but it should be recognized that various topics may apply to any, some, and/or all type of playing cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his “hand” he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by “scratching off” an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XIII. Rules of Card Games

Rules of Poker

In a basic poker game, which is played with a standard 52-card deck, each player is dealt five cards. All five cards in each player’s hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player’s hand. Regardless of the number of cards in a player’s hand, the values assigned to the cards, and the odds, the method of evaluating all five cards in a player’s hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a ‘dealer’ button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate numbers of cards are dealt to the players one at a time. Cards may be dealt either face-up or face-down, depending on the variant of poker being played. After the initial deal, the first of what may be several betting rounds begins. Between rounds, the players’ hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold 'em and Omaha hold 'em, respectively.

Poker Hand Rankings

Straight Flush

A straight flush is a poker hand such as Q♠ J♠ 10♠ 9♠ 8♠, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush, and is the highest ranking standard poker hand (excluding five of a kind).

Examples:

7♥, 6♥, 5♥, 4♥, 3♥ beats 5♠ 4♠ 3♠ 2♠ A♠

J♣ 10♣ 9♣ 8♣ 7♣ ties J♦ 10♦ 9♦ 8♦ 7♦

Four of a Kind

Four of a kind, or quads, is a poker hand such as 9♣ 9♠ 9♦ 9♥, J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples:

10♣ 10♦ 10♥ 10♠ 5♦ ("four tens" or "quad tens") defeats 6♦ 6♥ 6♠ 6♣ K♠ ("four sixes" or "quad sixes")

10♣ 10♦ 10♥ 10♣ Q♠ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3♦ 6♣ 6♥, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples:

10♠ 10♥ 10♦ 4♠ 4♦ ("tens full") defeats 9♥ 9♣ 9♠ A♥ A♣ ("nines full")

K♠ K♣ K♥ 3♦ 3♠ ("kings full") defeats 3♠ 3♥ 3♦ K♠ K♦ ("threes full")

Q♥ Q♦ Q♣ 8♥ 8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples:

A♥ Q♥ 10♥ 5♥ 3♥ ("ace-high flush") defeats K♠ Q♠ J♠ 9♠ 6♠ ("king-high flush")

A♦ K♦ 7♦ 6♦ 2♦ ("flush, ace-king high") defeats A♥, Q♥, 10♥, 5♥, 3♥, ("flush, ace-queen high")

Q♥ 10♥ 9♥ 5♥ 2♥ ("heart flush") ties Q♠ 10♠ 9♠ 5♠ 2♠ ("spade flush")

Straight

A straight is a poker hand such as Q♣ J♠ 10♠ 9♥ 8♥ which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

A hand such as A♣ K♣ Q♦ J♣ 10♠ is an ace-high straight, and ranks above a king-high straight such as K♥ Q♠ J♥ 10♥ 9♦. But the ace may also be played as a 1-spot in a hand such as 5♠ 4♦ 3♦ 2♠ A♣, called a wheel or five-high straight, which ranks below the six-high straight 6♠ 5♣ 4♣ 3♥ 2♥. The ace may not "wrap around", or play both high and low in the same hand: 3♣ 2♦ A♠ K♠ Q♣ is not a straight, but just ace-high no pair.

Examples:

8♠ 7♠ 6♥ 5♥ 4♠ ("eight-high straight") defeats 6♦ 5♠ 4♦ 3♥ 2♣ ("six-high straight")

8♠ 7♠ 6♥ 5♥ 4♠ ties 8♥ 7♦ 6♣ 5♣ 4♥

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples:

8♠ 8♥ 8♦ 5♣ 3♠ ("three eights") defeats 5♣ 5♥ 5♦ Q♦ 10♣ ("three fives")

8♠ 8♥ 8♦ A♣ 2♦ ("three eights, ace kicker") defeats 8♠ 8♥ 8♦ 5♠ 3♣ ("three eights, five kicker")

Two Pair

A poker hand such as J♥ J♣ 4♣ 4♠ 9♠, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♦), as in "Kings over nines", "Kings and nines" or simply "Kings up".

Examples:

K♥ K♦ 2♣ 2♦ J♥ ("kings up") defeats J♦ J♠ 10♠ 10 ♣ 9♠ ("jacks up")

9♠ 9♦ 7♦ 7♣ 6♥ ("nines and sevens") defeats 9♥ 9 ♠ 5♥ 5♦ K♣ ("nines and fives")

4♠ 4♣ 3♠ 3♥ K♦ ("fours and threes, king kicker") defeats 4♥ 4♦ 3♦ 3 10♠ ("fours and threes with a ten")

One Pair

One pair is a poker hand such as 4♥ 4♠ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples:

10♣ 10♠ 6♠ 4♥ 2♥ ("pair of tens") defeats 9♥ 9♣ A♥ Q♦ 10♦ ("pair of nines")

10♥ 10♦ J♦ 3♥ 2♣ ("tens with jack kicker") defeats 10 ♣ 10♠ 6♠ 4♥ 2♥ ("tens with six kicker")

2♦ 2♥ 8♣ 5♠ 4♣ ("deuces, eight-five-four") defeats 2 ♣ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples:

A♦ 10♦ 9♣ 5♠ 4♣ ("ace high") defeats K♣ Q♦ J♣ 8♥ 7♥ ("king high")

A♣ Q♠ 7♦ 5♥ 2♣ ("ace-queen") defeats A♦ 10♦ 9♣ 5 ♣ 4♣ ("ace-ten")

7♠ 6♣ 5♣ 4♦ 2♥ ("seven-six-five-four") defeats 7 ♣ 6♦ 5♦ 3♥ 2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that must qualify. As the dealer's hand is partially concealed during play (usually only one card, at most) is displayed to the player before player wagering is complete), the player must always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer must hit until he has a point total of at least 17, regardless of what the players have. In most casinos, the dealer must also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural' (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XIV. Casino Countermeasures

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XV. Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XVI. Apparatus for Playing Over a Communications System

Figure 3:
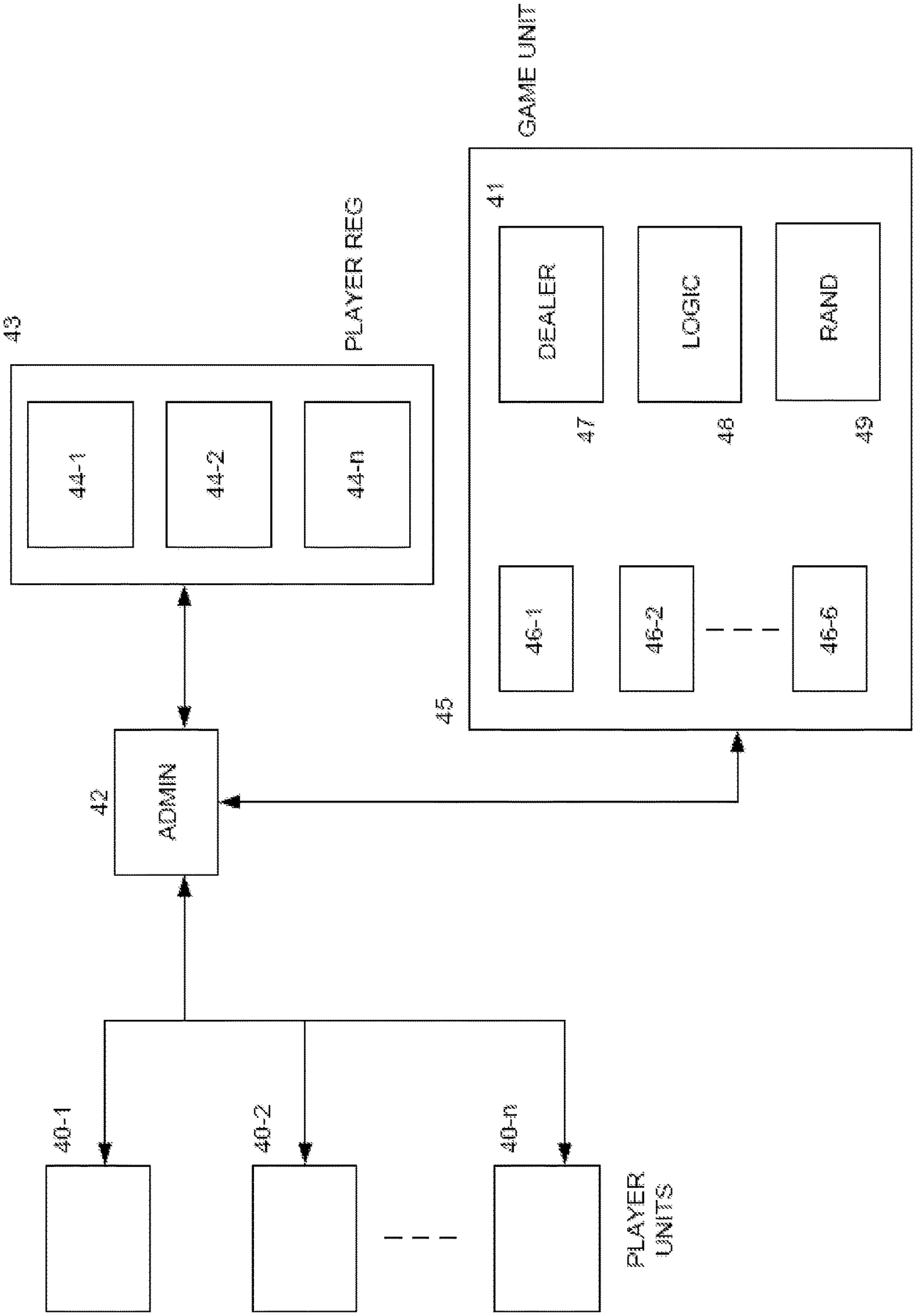
FIG. 3 shows an example apparatus that may be used to play one or more games in some embodiments.

FIG. 3 shows apparatus for playing the game. There is a plurality of player units 40-1 to **40-*n* which are coupled via a communication system 41, such as the Internet, with a game playing system comprising an administration unit 42, a player register 43, and a game unit 45. Each unit 40** is typically a personal computer with a display unit and control means (a keyboard and a mouse).

When a player logs on to the game playing system, their unit 40 identifies itself to the administration unit. The system holds the details of the players in the register 43, which contains separate player register units 44-1 to **44-*n*** for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XVII. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XVIII. References

The following patents and patent applications are hereby incorporated by reference herein for all purposes: U.S. Pat. No. 6,579,181, U.S. Pat. No. 6,299,536, U.S. Pat. No. 6,093,103, U.S. Pat. No. 5,941,769, U.S. Pat. No. 7,114,718, U.S. patent application Ser. No. 10/622,321, U.S. Pat. No. 4,515,367, U.S. Pat. No. 5,000,453, U.S. Pat. No. 7,137,630 and U.S. Pat. No. 7,137,629.

What is claimed is:

1. An distributed gaming apparatus comprising:
a processor;
a capturing device at a first venue;
a network link coupled to a remote gaming venue; and
a non-transitory medium having stored thereon a plurality of instructions that when executed by the processor cause the apparatus to:
register player identification data for each of a plurality of players, into a player identity database;
receive performance data describing play of a plurality of poker games that are played by respective players of the plurality of players, in which receiving the performance data includes:
receiving video information captured by the capturing device at the first venue,
comparing the video information with player identification data to determine actions related to play of a first poker game of the plurality of poker games by a first player of the plurality of players, and
receiving, through the network from the remote gaming venue, performance information for play of a second poker game of the plurality of poker games by a second player of the plurality of players at the remote gaming venue;
process the performance data to determine performance of each player of the plurality of players across the plurality of poker games;
calculate for each of the plurality of players, based on the performance data and in response to receiving respective performance data, a respective vector with a plurality of dimensions, in which each dimension of the plurality of dimensions describes a different aspect of poker game performance, in which each aspect is observable over multiple games of the plurality of poker games;
determining for each of the plurality of players, based on a respective multidimensional vector and in response to calculating a respective vector, an index metric by applying an algorithm to a respective plurality of dimensions to convert the respective multidimensional vector to a respective numerical value;
presenting an indication of the index metric for at least two players through a user interface of a client device;
matching the at least two players of the plurality of players together for a poker game based on at least one of a dimension of the multidimensional vector associated with each of the at least two players and the index metric associated with each of the at least two players;
facilitating play of the poker game with at least two players in response to the matching;
receiving, from the client device, a wager entered through the user interface on the poker game from a user that is not one of the at least two players, in which the wager is handicapped based on the index metric for the at least two players.

2. The distributed gaming apparatus of claim 1, in which matching includes matching based on a dimension of the multidimensional vector.

3. The distributed gaming apparatus of claim 1, in which the plurality of poker games includes internet poker games and physical poker games.

4. The distributed gaming apparatus of claim 1, in which a dimension of the plurality of dimensions describes an aspect based on an attribute of a player.

5. The distributed gaming apparatus of claim 1, in which a dimension of the plurality of dimensions describes an aspect based on at least one of: time per game, number of folds, number of hands played to a flop, number of hands played to a turn, number of hands played to a river, number of hands placed to completion, number of wins by raising of other players out of a game, number of wins when betting all in, number of all in bets, number of losses when betting all in, number of raises, number of calls, number of raises on a flop, number of raises on a turn, number of raises on a river, average amount of a raise, average amount of a raise in certain game states, highest raise, lowest raise, speed of decision making, times of day of games, wins by time of day, amount of money won, amount of money lost, success at receiving a straight when hoping to receive a straight, success at receiving a flush when hoping to receive a flush, average hold cards dealt to player, and bets made in games.

6. The distributed gaming apparatus of claim 1, in which a dimension of the plurality of dimensions describes an aspect based on a physical characteristic of a respective player.

7. The distributed gaming apparatus of claim 6, in which the physical characteristic includes at least one of: ethnicity, gender, color of hair, clothing style, glasses or no glasses, hat or no hat, facial hair, and hair style.

8. The distributed gaming apparatus of claim 1, comprising: for a player of the plurality of players, receiving a game criteria and in response to receiving the game criteria, determining a subset of the plurality of games in which the player played and that meet the game criteria, and determining a second index metric for the player based on only the subset of the plurality of games.

9. The distributed gaming apparatus of claim 8, in which the criteria includes at least one of: time of a game, a characteristic of an opponent, and a physical characteristic of the player.

10. The distributed gaming apparatus of claim 1, in which the plurality of instructions cause the apparatus to: for a player of the plurality of players, based on a dimension of a multidimensional vector, advise a change in play style to the player.

* * * * *